(12) United States Patent
Lehtonen

(10) Patent No.: US 7,360,432 B2
(45) Date of Patent: Apr. 22, 2008

(54) APPARATUS FOR DETECTING PRESSURE

(75) Inventor: Kai Lehtonen, Vaasa (FI)

(73) Assignee: Wartsila Finland OY, Vaasa (FI)

( * ) Notice: Subject to any disclaimer, the term of this patent is extended or adjusted under 35 U.S.C. 154(b) by 49 days.

(21) Appl. No.: 10/595,598

(22) PCT Filed: Nov. 17, 2004

(86) PCT No.: PCT/FI2004/000690

§ 371 (c)(1),
(2), (4) Date: Apr. 28, 2006

(87) PCT Pub. No.: WO2005/059343

PCT Pub. Date: Jun. 30, 2005

(65) Prior Publication Data

US 2007/0095134 A1    May 3, 2007

(30) Foreign Application Priority Data

Dec. 18, 2003  (FI) .................................. 20031850

(51) Int. Cl.
*G01L 7/16* (2006.01)
(52) U.S. Cl. ....................................................... 73/744
(58) Field of Classification Search ................. 73/744; 123/497
See application file for complete search history.

(56) References Cited

U.S. PATENT DOCUMENTS

| 4,788,525 A | | 11/1988 | Lichtenstein | |
|---|---|---|---|---|
| 5,120,201 A | * | 6/1992 | Tuckey et al. | 417/366 |
| 5,133,323 A | * | 7/1992 | Treusch | 123/494 |
| 5,237,975 A | * | 8/1993 | Betki et al. | 123/497 |
| 5,337,718 A | | 8/1994 | Tuckey | |
| 6,427,667 B1 | * | 8/2002 | Kato | 123/470 |
| 2002/0152995 A1 | * | 10/2002 | Kato | 123/470 |

FOREIGN PATENT DOCUMENTS

| DE | 10018618 | 10/2001 |
|---|---|---|
| DE | 10018620 | 10/2001 |
| DE | 10018623 | 10/2001 |
| DE | 10018665 | 10/2001 |
| EP | 0565028 | 10/1993 |
| EP | 0777247 | 6/1997 |
| FR | 2521341 | 8/1983 |
| JP | 10125171 | 8/1998 |

\* cited by examiner

*Primary Examiner*—Andre J. Allen
(74) *Attorney, Agent, or Firm*—Smith-Hill and Bedell

(57) ABSTRACT

The present invention relates to apparatuses for detecting fuel pressure in internal combustion engines. The invention especially relates to internal combustion engine applications in which fuel reaches a high pressure. The apparatus according to the invention is a simple switch apparatus. In the apparatus the fuel pressure moves a piston causing a switching operation in the apparatus, which in turn can be detected by means of a separate detector.

9 Claims, 1 Drawing Sheet

APPARATUS FOR DETECTING PRESSURE

Figure 1:
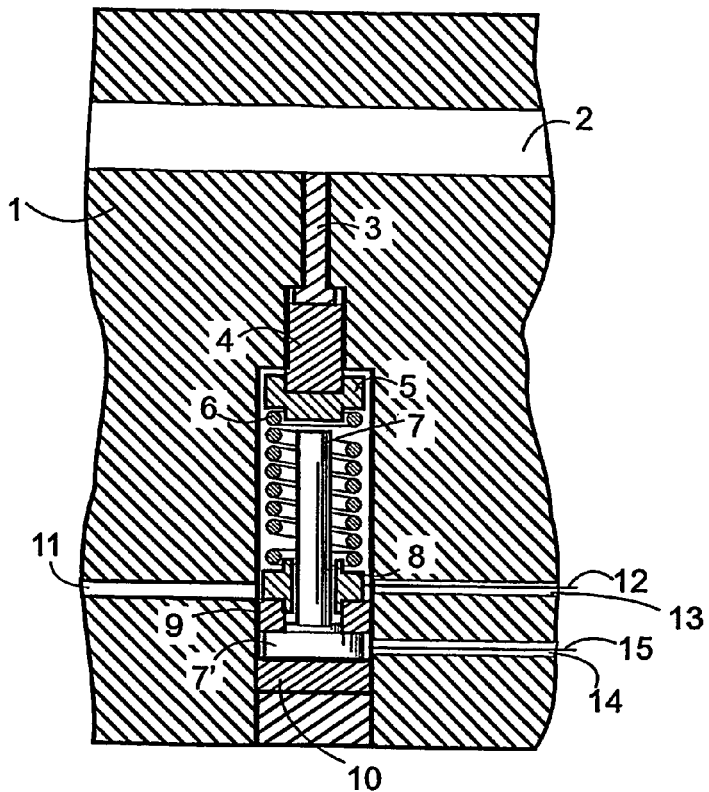

This is a national stage application filed under 35 USC 371 based on International Application No. PCT/FI2004/000690 filed Nov. 17, 2004, and claims priority under 35 USC 119 of Finnish Patent Application No. 20031850 filed Dec. 18, 2003.

TECHNICAL FIELD

The present invention relates to apparatuses for detecting fuel pressure in internal combustion engines. The invention specially relates to internal combustion engine applications in which fuel reaches a high pressure. The invention additionally relates to applications in which the fuel is heavy fuel oil.

PRIOR ART

In many fuel injection systems of combustion engines it is necessary to know when the pressure starts to rise (beginning of injection). For example, in so-called Common Rail systems the fuel pressure is increased to about 1500 bar before the fuel is injected into the combustion chamber via the injector nozzle. The pressure information is needed in order to have the fuel injected in the cylinder at the right time.

In addition, many internal combustion engines operate in relatively high temperatures. In, for example, large diesel engines running on heavy fuel oil the operation temperature is in the order of 120° C.

In a number of current systems the electronics of the engine takes care of the pressure detection operation. In practice this means that the electronics is set to control the injection in various operating ranges of the engine. The set values for the electronics are obtained from, for example, test runs of the engine. Direct measurement of fuel pressure is therefore not necessarily used for finding out the fuel injection timing and the duration in fuel injection systems based on electronics. A problem with these systems is that as there is wear on the engine during operation, the set values of the electronics no longer correspond with the changed conditions in the engine, whereby the engine runs on a decreased efficiency, causing more stresses on the structure of the engine. Because of this, the engine must be serviced at certain intervals.

Detecting the fuel pressure by means of pressure sensors is possible, but such apparatuses are expensive. There are a number of pressure sensors available on the market, but as the sensor must be able withstand a pressure of over 1000 bar in a temperature of over 100 degrees, there are hardly any commercial solutions at a reasonable price, and therefore they are not used. A known solution is, however, disclosed in publication U.S. Pat. No. 4,566,417, in which the fuel pressure is measured from the fuel pump by means of a pressure sensor. The sensor is based on a piezo-electric element. A problem with this sensor is that the dimensioning for a low operation range (operating at a pressure of, for example, about 20 bar) and a simultaneous requirement for high maximum pressure (e.g. about 1500 bar) is very difficult, if not impossible, to carry out. Another challenge is the operation in a temperature of over 100 degrees.

Complex cylinder-specific systems for detecting pressure are relatively commonly used. These applications are expensive as well.

The aim of the invention is to remove/reduce the said prior art problem.

SHORT DESCRIPTION OF THE INVENTION

The invention is based on the idea that there is no need for an accurate measurement of pressure. What must actually be known is the moment the fuel pressure exceeds a certain pre-determined level. A simple on-off-detector will be sufficient for this. Such an inventive detector can be produced by allowing the pressure to cause a switching operation when the pressure exceeds a certain limit. Detecting the switching operation still allows the desired operations to be carried out, such as correcting the timing of the fuel injection. A simple operation can be carried out by means of a solution that's simple yet durable in the conditions.

An apparatus according to the invention comprises a resilient element including a first end being in direct connection with, for example, a high-pressure fuel line, and a second end being in connection with the resilient element, and a circuit having interfaces outside the apparatus.

When the pressure reaches a certain value (or exceeds it) the piston moves towards the resilient element allowing the movement, when a sufficient pressure is acting on the first end of the piston. Thus, the location of the second end of the piston depends on the movement of the piston, and in a certain location it will form a mechanical contact closing the circuit, which can be seen from the interfaces.

The resilient element is preferably a spring or the like. The circuit comprises a first part including a first conductor and a second part comprising a second conductor. The apparatus preferably also includes a movement restrictor stopping the movement of the piston towards the resilient element at a certain location.

The end of the piston presses an intermediate part being in connection therewith, the intermediate part further pushing upper support of the spring of the apparatus. The spring of the apparatus springs under the influence of the transmitted power. The lower support stays in place giving support.

The spring does not spring to its extreme limits, but its movement is limited by means of a movement restrictor. In other words, when the spring has sprung for a certain length, the upper support of the spring touches the movement restrictor, whereby the above-mentioned connecting operation is formed. The connecting operation closes the circuit of the apparatus. The circuit consists of two parts, the first of which comprises the movement restrictor and the second of which comprises the upper support of the spring, the spring, and the lower support of the spring. The first and second part are connected to conductors that are in connection with a detector detecting the connecting operation. The detector can be, for example, an operation amplifier connection acting as a comparator. Thus, the detector is a separate part of the apparatus according to the invention.

Because the apparatus comprises a circuit, insulator parts are needed as well to insulate the parts of the circuit from each other and other structures. An insulator part is located between the lower support of the spring and the base (i.e. lower end) of the movement restrictor. An insulation part is located between the base of the movement restrictor and the rest of the structure as well. The intermediate part is made of an insulating material as well.

LIST OF FIGURES

Figure 2:
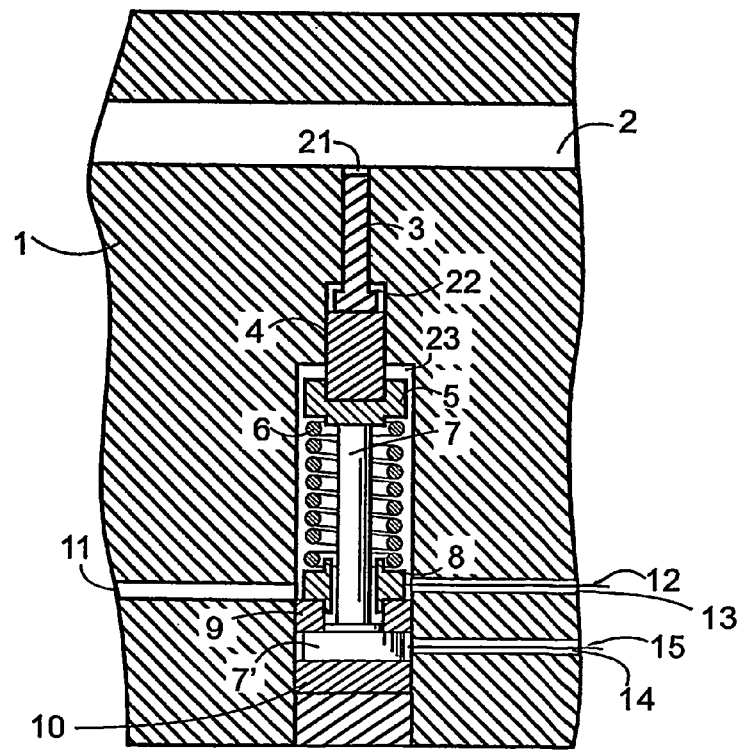

In the following, the invention is described in more detail, with reference to the appended figures, of which FIG. 1 illustrates an example of an embodiment according to the invention, and FIG. 2 illustrates the operation of the apparatus in the operation mode in which the pressure is detected.

DESCRIPTION OF THE INVENTION

FIG. 1 illustrates an example of an apparatus according to the invention with the apparatus in rest mode, i.e. with the switch formed by the apparatus open. The piston 3 of the apparatus is in connection to volume 2 containing high-pressure fuel. In this example the body structure 1 of the apparatus is integral with the surrounding structure (e.g. when the spaces required by the apparatus are bored in the desired place in the engine structure). It is, however, also possible that the structure is a separate structure connected to the surrounding structure.

The lower end of the piston is in connection to the intermediate part 4 being in connection to the upper support 5 of the spring 6 of the apparatus. The clearance between the intermediate part and the body is large, whereby great heat expansion differences do not hinder the operation. The intermediate part is to transfer the movement of the piston to the upper support of the spring and to prevent contact between the upper support of the spring and the body construction. It is to be noted that in this disclosure the terms upper and lower end etc. mean the portion of the part of the apparatus located above volume 2. Correspondingly the terms lower and upper side etc. mean the part of the apparatus further away from the said volume.

Spring 6 is located between the upper support 5 and the lower support 8 of the spring. Movement restrictor 7 is located partly inside the spring, the lower end 7' (i.e. base) of which is located outside the spring. The spring is preferably a coil spring and the movement restrictor is preferably a tap comprising a body and a base, the body thus being located inside the coil spring and the base being outside the coil spring, to which base the first conductor 15 is connected.

An insulator part 9 is located between the lower support 8 and the base of the movement restrictor 7' and a second insulator part 10 is located between the base of the spring and the body construction. The second insulator part is preferably a plate receiving the forces caused by the fuel pressure as well.

The insulator part between the lower support of the spring and the movement restrictor is preferably a ring, shaped in a suitable way. The ring thus insulates the movement restrictor from the lower support of the spring and locates the movement restrictor in sideways direction. Second conductor 12 is connected to the lower support of the spring. The insulator parts and the intermediate part are of ceramic material, but they can also be of another mechanically durable (compression strength) electrically insulating material with a good heat resistance as well. The intermediate part must especially be compression and heat resistant.

The volume in which the spring and its supports are located, is preferably provided with a leak channel 11 for fuel, if any, leaking therefrom. The body structures are additionally provided with channels 13, 14 for the first 15 and the second 12 conductor.

FIG. 2 illustrates an apparatus example according to the invention with the apparatus in operation mode, i.e. with the switch formed by the apparatus closed. As the fuel pressure has risen to a certain level or even over a certain level, the piston 3 presses the intermediate part 4 which further moves the effect of the pressure to the upper support 5 of the spring. The spring 6 is made to spring by the pressure until the tap of the movement restrictor 7 couches the upper support of the spring, as shown in figure 2. The contact between the upper support of the spring and the movement restrictor closes the circuit of the apparatus, the circuit thus comprising two parts (and the conductors in connection therewith). As was mentioned above, the first part comprises the movement restrictor 7 and the second part comprises the spring 6, the upper support 5 of the spring and the lower support 8 of the spring.

The conductors are connected to the detector detecting the connection carried out by the apparatus. When the pressure does not move the piston 3 towards the spring and the spring 6 keeps it place in the position shown in FIG. 1, the circuit is open and the resistance measured from the circuit is large. When the elevated pressure moves the piston towards the spring, the circuit closes. The resistance measured from a closed circuit is small. It is also possible to measure another electrical quantity. The detector can be a simple circuit that does not require more complex electronics. For example, one operation amplifier connected as a comparator is sufficient. Thus, it is not deemed necessary to describe the design of the detector in closer detail in this text, as it is not considered essential as far as the invention is concerned.

It can be seen in FIG. 2 that in the body structure of the apparatus is arranged a first volume 21 for the piston, a second volume 22 for the for intermediate part and the second end of the piston, a third volume 23 for the spring and the upper and lower supports thereof, the movement restrictor and the insulator parts and a fourth 13 and a fifth 14 volume are arranged for the said conductors. The body structure further comprises a sixth volume 11 being in connection with the third volume and thus forming the above-mentioned leakage channel for fuel, if any, that has leaked out from the volume 2 under pressure.

The clearance between the piston and the body structure is preferably very small, which will prevent leakage from the pressurised space. Because the body and the piston are produced from essentially similar material, in practice preferably from the same material, there will be no problems due to heat expansion. The diameter of the piston is preferably dimensioned very small in order to minimise the power caused by the maximum pressure.

Thus, the invention relates to an apparatus for detecting pressure in a volume pressurised by the fuel pressure. An apparatus according to the invention comprises a resilient element, a piston including a first end being in direct connection with, for example, a high-pressure fuel line, and a second end being in connection with the resilient element, and a circuit having interfaces outside the apparatus.

When the pressure reaches a certain value (or exceeds it) the piston moves towards the resilient element allowing the movement, when a sufficient pressure is acting on the first end of the piston. Thus, the location of the second end of the piston depends on the movement of the piston, and in a certain location it will form a mechanical contact closing the circuit, which can be seen from the interfaces.

The resilient element is preferably a spring or the like. The circuit comprises a first part including a first conductor and a second part comprising a second conductor. The apparatus preferably also includes a movement restrictor stopping the movement of the piston towards the resilient element at a certain location. The ends of the conductors are arranged for example on opposite sides of the volume in which the other end of the piston and the resilient element are arranged, preferably at a location in which the other end of the piston closes the circuit, i.e. forms a contact, as the movement restrictor stops the movement of the piston. As the pressure decreases, the spring means pushes the piston towards the fuel volume, whereby the circuit opens.

One embodiment of the invention comprises a spring, an upper support of the spring for supporting the upper end of the spring, a lower support of the spring for supporting the lower end of the spring and an intermediate part being in connection with the upper support of the spring. The apparatus further comprises a piston, the first end of which is in connection with the said volume and the second end of which is in connection with the intermediate part. The intermediate part is an element transmitting the movement of the spring to the upper support of the spring, the spring in connection therewith being movable because of the movement of the spring. The apparatus further comprises a movement restrictor forming a part of the first circuit—the spring, the upper support of the spring and the lower support of the spring forming the second part of the circuit—a first conductor in connection with the first part of the circuit and a second conductor, connected to the second part of the circuit, and insulator parts, which together with the intermediate part insulate the said circuits from each other and other structures. In the apparatus, the movement restrictor restricts the movement of the spring and the piston as pressure pushes the piston towards the intermediate part, simultaneously forming a contact surface between it and the upper support of the spring, whereby the first and the second parts of the circuit are connected together, which can be detected by measuring the desired electrical quantity from between the first and second conductors.

It can further be seen from FIGS. 1 and 2 that it is preferable for the movement restrictor to be shaped and located as shown, comprising a tap on the inside of the spring and a base on the outside. Thus it will be possible to connect the conductor to the base so that the connection is in the part that does not move. It is accordingly preferable to connect the second conductor to the lower support of the spring, because the lower support is not a movable part. If the connection of the conductor is made to a moving part, such as the upper support of the spring, the connection must be flexible enough to move With the moving part. This solution would be more prone to failures/breakages. It is thereby preferable to have at least one stationary part in the first and second parts of the circuit, to which the conductor can be attached.

There are other solutions for implementing the movement restrictor. It can, for example, consist of two parts: a tap-like extension on the upper support, being located inside the coil spring, and a base, located outside the coil spring on the other side of the lower support in relation to the spring, to which base the first conductor is connected. In other words, the tap of the movement restrictor according to the FIGS. 1-2 abuts with the upper support of the spring instead of the base. An insulator is arranged between the base of the movement restrictor and the lower support of the spring as shown in figures. The invention is applicable to all internal combustion engines and it can be arranged at any suitable location. A preferable location for the apparatus according to the invention is in connection with the high-pressure fuel line between the control valve and the injector nozzle. The invention is specially suitable for diesel engines, especially for large diesel engines. An especial application area are internal combustion engines running on heavy fuel oil.

An advantage of the pressure switch as disclosed in the invention is its simplicity and the inexpensive production costs resulting therefrom as well as its long service life. Service operations can be carried out better as needed and there are necessary pre-determined service times. It is easy to dimension the apparatus for the desired pressure value and it can additionally withstand very high pressures and temperatures.

In order to keep the production costs in check all ceramic (or other material) parts are very simple in form and exact production tolerances are not required for them. The only part with exact tolerances is the piston (metallic) in the upper part of the switch. The clearance between the piston and the body is preferably as small as possible for minimising leakages.

On the basis of the embodiment described above it will be obvious that an application according to the invention can be carried out in a way other than that described here. Thus, the invention is not limited to the above-mentioned example only, but it can be carried out by a number of ways within the scope of the invention.

The invention claimed is:

1. An apparatus for detecting fuel pressure in a pressurized fuel volume bounded by a body structure attached to a combustion engine, said apparatus comprising:
   a piston having a first end in direct communication with said volume and also having an opposite second end,
   a resilient element having first and second opposite ends, the first end of the resilient element being between the piston and the second end of the resilient element,
   a first support element supporting the resilient element at its first end,
   a second support element supporting the resilient element at its second end,
   an intermediate part between the piston and the first support element for transmitting movement of the piston to the first support element, movement of the first support element in a direction towards the second support element being resisted by the resilient element,
   a movement restrictor for preventing movement of the piston in said direction beyond a position at which the first support element engages the movement restrictor,
   a first electrical circuit part connected to the movement restrictor,
   a second electrical circuit part connected to the resilient element, the first support element and the second support element, and
   insulator means insulating the first and second electrical circuit parts from each other and from the body structure when the first support element is spaced from the movement restrictor,
   whereby when pressure in the fuel volume urges the piston in said direction to said position, engagement of the first support element with the movement restrictor connects the first and second electrical circuit parts.

2. An apparatus according to claim 1, wherein the resilient element is a spring.

3. An apparatus according to claim 1, wherein the first electrical circuit part includes a first conductor and the second electrical circuit part includes a second conductor.

4. An apparatus according to claim 1, wherein the resilient element is a coil spring, the movement restrictor is a tap comprising a body and a base, the body is located inside the coil spring, the base of the tap is located outside the coil spring, and the first electrical circuit part is connected to the base.

5. An apparatus according to claim 1, wherein the resilient element is a coil spring, the movement restrictor comprises a base and a tap-like extension of the upper support, the tap-like extension is located inside the coil spring, the base is located outside the coil spring on the other side of the lower support in relation to the spring, and the first electrical circuit part is connected to the base.

6. An apparatus according to claim 1, wherein the body structure bounds a first volume for the piston, a second volume for the intermediate part and the second end of the piston, a third volume for the resilient element, the upper and lower supports of the resilient element, the movement restrictor and the insulator parts, and fourth and fifth volumes for said first and second electrical circuit parts respectively.

7. An apparatus according to claim 6, wherein the body structure bounds a sixth volume that is in communication with the third volume, thus forming a leakage channel for any material that leaks from the pressurized fuel volume.

8. An apparatus according to claim 1, wherein the insulator parts comprise a plate located between the base of the movement restrictor and the body structure, and a ring located between the base of the movement restrictor and the lower support of the resilient element, to which support the second electrical circuit part is connected.

9. An apparatus according to claim 1, wherein the insulator parts and the intermediate part are of ceramic material.

* * * * *